US012183023B2

(12) United States Patent
Zhou

(10) Patent No.: US 12,183,023 B2
(45) Date of Patent: Dec. 31, 2024

(54) METHODS AND APPARATUS FOR DEPTH ESTIMATION USING STEREO CAMERAS IN A VEHICLE SYSTEM

(71) Applicant: PlusAI, Inc., Santa Clara, CA (US)

(72) Inventor: Mianwei Zhou, Santa Clara, CA (US)

(73) Assignee: PlusAI, Inc., Santa Clara, CA (US)

( * ) Notice: Subject to any disclaimer, the term of this patent is extended or adjusted under 35 U.S.C. 154(b) by 0 days.

(21) Appl. No.: 18/132,311

(22) Filed: Apr. 7, 2023

(65) Prior Publication Data
US 2023/0394694 A1 Dec. 7, 2023

Related U.S. Application Data

(63) Continuation of application No. 17/831,422, filed on Jun. 2, 2022, now Pat. No. 11,651,508.

(51) Int. Cl.
*G06T 7/593* (2017.01)
*B60W 60/00* (2020.01)
*G06V 10/25* (2022.01)
*G06V 10/764* (2022.01)
*G06V 20/58* (2022.01)

(52) U.S. Cl.
CPC .............. *G06T 7/593* (2017.01); *G06V 10/25* (2022.01); *G06V 10/764* (2022.01); *G06V 20/58* (2022.01); *B60W 60/0015* (2020.02); *B60W 2420/403* (2013.01); *B60W 2554/20* (2020.02); *B60W 2554/402* (2020.02); *G06T 2207/10012* (2013.01); *G06T 2207/20081* (2013.01); *G06T 2207/30252* (2013.01); *G06V 2201/08* (2022.01)

(58) Field of Classification Search
CPC ........... G06T 7/593; G06T 2207/10012; G06T 2207/20081; G06T 2207/30252; G06V 10/25; G06V 10/764; G06V 20/58; G06V 2201/08; B60W 60/0015; B60W 2420/42; B60W 2554/20; B60W 2554/402
See application file for complete search history.

(56) References Cited

U.S. PATENT DOCUMENTS

| 9,131,150 | B1 * | 9/2015 | Mangiat | H04N 23/72 |
| 9,436,870 | B1 * | 9/2016 | Mangiat | G06V 40/161 |
| 10,666,926 | B1 * | 5/2020 | El Dokor | H04N 13/246 |
| 10,957,064 | B2 | 3/2021 | Ganguli et al. | |

(Continued)

FOREIGN PATENT DOCUMENTS

IN 202241013469 * 3/2022 ............. G01B 11/02

*Primary Examiner* — Santiago Garcia
(74) *Attorney, Agent, or Firm* — Sheppard Mullin Richter & Hampton LLP

(57) ABSTRACT

A method comprises: receiving, at a processor, a first image from a first camera from a stereo camera pair and a second image from a second camera from the stereo camera pair. The method also includes determining, at the processor using a machine learning model, a first set of objects in the first image. The processor determines an object type. The processor identifies a second set of objects in the second image associated with the first plurality of objects. The method also includes calculating, at the processor, a set of disparity values between the first image and the second image based on (1) an object from the first set of objects, (2) an object from the second set of objects and associated with the object from the first set of objects, and (3) an object type of the object from the first set of objects.

20 Claims, 7 Drawing Sheets

(56) References Cited

U.S. PATENT DOCUMENTS

| | | | |
|---|---|---|---|
| 2017/0225686 A1* | 8/2017 | Takaso | B60W 10/184 |
| 2019/0258876 A1* | 8/2019 | Liu | G06V 20/647 |
| 2020/0410707 A1* | 12/2020 | Ajiki | G03B 3/00 |
| 2021/0065393 A1* | 3/2021 | Jeon | G06F 18/213 |
| 2021/0174530 A1* | 6/2021 | Ganguli | G06T 7/593 |
| 2021/0334569 A1* | 10/2021 | Fang | G06V 40/171 |
| 2022/0012503 A1* | 1/2022 | Peppoloni | G06V 20/58 |
| 2022/0183208 A1* | 6/2022 | Sibley | G05D 1/249 |
| 2022/0261593 A1* | 8/2022 | Yu | G06N 3/088 |
| 2023/0143262 A1* | 5/2023 | Diagilev | G06T 7/62 |
| | | | 382/103 |
| 2023/0334675 A1* | 10/2023 | Guo | G06T 7/292 |

* cited by examiner

METHODS AND APPARATUS FOR DEPTH ESTIMATION USING STEREO CAMERAS IN A VEHICLE SYSTEM

CROSS-REFERENCE TO RELATED APPLICATIONS

This application is a continuation of U.S. patent application Ser. No. 17/831,422, filed on Jun. 2, 2022 and entitled "METHODS AND APPARATUS FOR DEPTH ESTIMATION USING STEREO CAMERAS IN A VEHICLE SYSTEM", which is incorporated in its entirety herein by reference.

FIELD

The present disclosure relates to stereo depth estimation in vehicles (such as semi-autonomous vehicles or autonomous vehicles), and more specifically, to use prior knowledge in stereo depth estimation to achieve real time and accurate depth estimation result.

BACKGROUND

Sensing and control technology can be used in a moving vehicle to make correct vehicle control decisions in dynamic situations. In such applications, the sensing and control technology performs depth estimation to estimate the distance to other objects such as vehicles, pedestrians, animals, obstacles, rain drops, snowflakes, haze particle, fog particle, etc., and/or to estimate the location, type, relative distance, size, shape, etc. of signs, lane markers, shoulder areas, roads, buildings, etc.

The known way to estimate depth involves the use of a LiDAR sensor. The cost of a LiDAR sensor, however, is high, and a LiDAR sensor is sensitive to weather conditions such as rain, snow, fog, and haze, etc. A less costly alternative to a LiDAR sensor for depth estimation is stereo cameras. Stereo depth estimation can estimate depth from the stereo camera pair. Stereo vision is similar to three-dimensional (3D) perception in human vision and is based on the triangulation of rays from multiple viewpoints. Thus, it is desirable for a driving system (such as a semi-autonomous driving system or an autonomous driving system) to estimate depth using stereo cameras.

SUMMARY

In some embodiments, a method includes receiving, at a processor, a first image from a first camera from a stereo camera pair and a second image from a second camera from the stereo camera pair. The first image has a first plurality of pixels. The second image has a second plurality of pixels. The method also includes determining, at the processor using a machine learning model and based on the first plurality of pixels, a first set of objects in the first image. The processor determines an object type from a plurality of object types for each object from the first set of objects. The processor searches the second plurality of pixels to identify a second set of objects in the second image associated with the first plurality of objects. The method also includes calculating, at the processor, a set of disparity values between the first image and the second image based on (1) an object from the first set of objects, (2) an object from the second set of objects and associated with the object from the first set of objects, and (3) an object type of the object from the first set of objects. The processor calculates, based on the set of disparity values, depth information of the object from the first set of objects relative to the stereo camera pair. The processor sends a signal representing the depth information to a driving controller.

In some embodiments, a non-transitory processor-readable medium storing code representing instructions to be executed by a processor, the code comprising code to cause the processor to receive a first image from a first camera from a stereo camera pair and a second image from a second camera from the stereo camera pair. The first image has a first plurality of pixels. The second image has a second plurality of pixels. A first set of objects in the first image is determined using a machine learning model and based on the first plurality of pixels. An object type from a plurality of object types is determined for each object from the first set of objects. A first region of interest of an object from the first set of objects in the first image is identified based on an object type of the object. A second region of interest in the second image based on the first region of interest is identified. A set of disparity values between a first set of pixels in the first region of interest and a second set of pixels in the second region of interest is calculated based on the object type. Depth information of the object relative to the stereo camera pair is calculated based on the set of disparity values. A signal representing the depth information to a driving controller is sent.

In some embodiments, a system includes a stereo camera pair having a first camera configured to capture a first image and a second camera configured to capture a second image. The system also includes a processor operatively coupled to the stereo camera pair and a memory operatively coupled to the processor. The memory stores instructions that when executed to cause the processor to determine using a machine learning model and based on a first plurality of pixels in the first image, an object in the first image. The processor is also configured to determine an object type for the object. The processor is configured to identify a first region of interest of the object based on an object type. The processor is also configured to identify a second region of interest in the second image based on the first region of interest. The processor is configured to calculate, based on the object type, a set of disparity values between a first set of pixels sampled from pixels in the first region of interest and a second set of pixels sampled from pixels in the second region of interest. The processor is configured to calculate based on the set of disparity values, depth information of the object relative to the stereo camera pair. The processor is also configured to send a signal representing the depth information to a driving controller.

DETAILED DESCRIPTION

Figure 1:
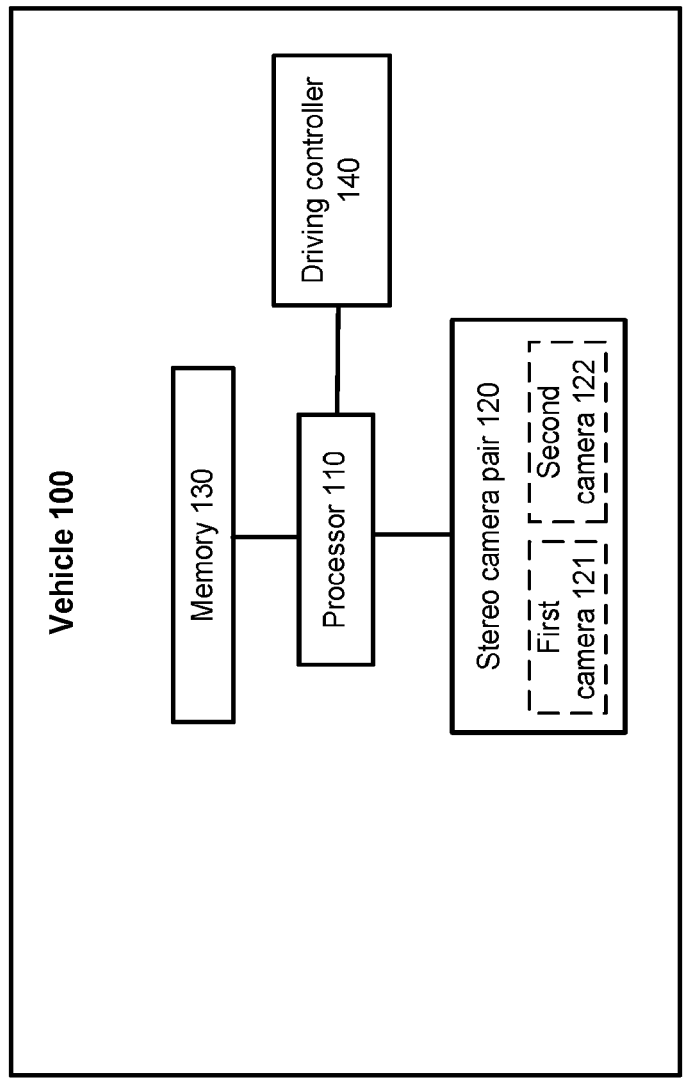
FIG. 1 is a block diagram of a vehicle that can estimate depth using stereo cameras, according to an embodiment.

Depth estimation can be used semi-autonomous driving or autonomous driving because depth is a parameter that can be used to perform perception, navigation and trajectory planning. Depth estimation can be performed relative to other vehicles, pedestrians, animals, obstacles, rain drops, snowflakes, haze particle, fog particle, etc., and/or can indicate the location, type, relative distance, size, shape, etc. of signs, lane markers, shoulder areas, roads, buildings, etc.

A known way to estimate depth involves the use of a LiDAR sensor. The cost of a LiDAR sensor, however, is high, and a LiDAR sensor is sensitive to weather conditions such as rain, snow, fog, and haze, etc. A less costly alternative to a LiDAR sensor for depth estimation is stereo cameras. Stereo depth estimation can estimate depth from the stereo camera pair. Stereo vision can be similar to three-dimensional (3D) perception in human vision and is based on the triangulation of rays from multiple viewpoints. However, depth estimation using stereo cameras is often very computationally expensive and thus are not applicable for real time usage. Using stereo cameras to estimate depth can face other challenges. Specifically, known methods in stereo camera depth estimation calculate the depth of a pixel from surrounding pixels, which might be inaccurate when the surrounding pixels do not relate to the same object as the target pixel. Thus, there is a need for a driving system (such as a semi-autonomous driving system or an autonomous driving system) to estimate depth using stereo cameras on-the-fly and with more accurate results.

Embodiments described herein include systems and methods to improve stereo estimation techniques for vehicles by classifying pixels based on object types prior to depth estimation. For different types of objects, the shapes of the objects could be considered when computing disparities between the pair of stereo camera images to improve both accuracy and efficiency. Based on the semantic information and/or the classified shapes, disparities between the pair of the stereo camera images can be calculated for pixels in certain regions, thus optimizing (or improving) the depth estimation and decreasing the computational expenses for stereo camera depth estimation. A sample of the pixels can be selected to calculate disparities to represent the disparities of the entire object, thus further reducing computational expenses for stereo camera depth estimation. Moreover, different objects (such as vehicles and roads) typically have different disparity distribution. For example, distant objects such as the sky or a mountain(s) are not as important as closer objects for the purpose of disparity computation. Thus, the systems and methods described herein may not calculate disparity for the distant object(s) such as the sky or a mountain(s), in some implementations. For another example, closer objects (e.g., vehicles or road signs) do not need to have all the pixels of the vehicles calculated for disparities. In some implementations, the systems and methods described herein may calculate disparity based on a sample of pixels of the closer objects. For yet another example, the pixels of the ground can have the same disparities between the pair of stereo camera images along a horizontal line and the disparity can continuously become smaller from the bottom of the image to the top of the image. Thus, the systems and methods described herein may determine certain pixels in the stereo camera images to be the ground and thus calculate a sample of pixels of the ground.

For yet another example, the pixels of the wall can have the same disparities between the pair of stereo camera images along a vertical line and the disparity can continuously become smaller from the bottom of the image to the top of the image. Thus, similarly, the systems and methods described herein may determine certain pixels in the stereo camera images to be a wall and thus calculate a sample of pixels of the wall. Based on the different disparity distributions for different objects with different shapes, accuracy of depth estimation can be improved significantly with efficient use of computational resources.

A vehicle can operate in a manual driving mode, or a vehicle can operate in a manual driving mode during one time period and operate in a partially autonomous mode or a fully autonomous driving mode during a different time period. Autonomous vehicles can include, for example, a fully autonomous vehicle, a partially autonomous vehicle, a vehicle with driver assistance, or an autonomous capable vehicle. The capabilities of autonomous vehicles can be associated with a classification system or taxonomy having tiered levels of autonomy. A classification system can be specified by, for example, industry standards or governmental guidelines. For example, the levels of autonomy can be considered using a taxonomy such as level 0 (momentary driver assistance), level 1 (driver assistance), level 2 (additional assistance), level 3 (conditional assistance), level 4 (high automation), and level 5 (full automation without any driver intervention). In some instances, a given level can include the capabilities included in the lower level(s); for example, level 2 can include the momentary driver assistance of level 0 and the driver assistance of level but can also include additional assistance associated with level 2. An autonomous vehicle can be capable of operating, in some instances, in at least one of levels 0 through 5. According to various embodiments, an autonomous capable vehicle may refer to a vehicle that can be operated by a driver manually (that is, without the autonomous capability activated) while being capable of operating in at least one of levels 0 through 5 upon activation of an autonomous mode. For example, an autonomous capable vehicle can operate in a given level (e.g., level 2), which can be deactivated to allow a driver to operate the vehicle manually (i.e., in a manual driving mode). As used herein, the term "driver" may refer to a local operator (e.g., an operator in the vehicle) or a remote operator (e.g., an operator physically remote from and not in the vehicle). The autonomous vehicle may operate solely at a given level (e.g., level 2 additional assistance or level 5 full automation) for at least a period of time or during the entire operating time of the autonomous vehicle. Other classification systems can provide other levels of autonomy characterized by different vehicle capabilities.

Vehicles (e.g., autonomous vehicles) described herein can be configured to wirelessly communicate with one or more remote compute devices, during periods of time when wireless connectivity is available/possible, for a variety of purposes including, but not limited to: receiving third-party data, receiving global positing system (GPS) data, receiving navigation commands, receiving or transmitting map data, receiving remote sensor data (i.e., data from sensors not disposed within or on the autonomous vehicle, but pertinent to the operations of the autonomous vehicle, such as sensors to detect road moisture, wind and temperature data associated with one or more locations along a route of travel, earthquake detection instruments (e.g., seismometers), etc.), transmitting sensor data generated at the autonomous vehicle, transmitting alerts, etc.

FIG. 1 is a block diagram of a vehicle 100 that can estimate depth using stereo cameras, according to an embodiment. The vehicle 100 can be for example any type of vehicle, such as a car, bus, or semitruck, and can be an autonomous vehicle as described above. As shown in FIG. 1, the vehicle 100 includes a processor 110, a stereo camera pair 120 operatively coupled to the processor 110, a memory 130 operatively coupled to the processor 110, and a driving controller 140 operatively coupled to the processor 110.

The processor 110 can perform (or cause to be performed) any of the techniques discussed herein. The processor 110 can be or include, for example, a hardware-based integrated circuit (IC) or any other suitable processing device configured to run and/or execute a set of instructions or code. For example, the processor 110 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor 110 can run any of the methods and/or portions of methods discussed herein. Although as shown in FIG. 1 the processor 110 is disposed with or within the vehicle 100, in alternative implementations, or the processor 110 can be remote from the vehicle 100.

The memory 130 can be, for example, a random-access memory (RAM), a memory buffer, a hard drive, a read-only memory (ROM), an erasable programmable read-only memory (EPROM), and/or the like. The memory 130 can store sensor data collected by the stereo camera pair 120, and any other data used by the processor 110 to perform the techniques discussed herein. In some instances, the memory 130 can store, for example, one or more software programs and/or code that can include instructions to cause the processor 110 to perform one or more processes, functions, and/or the like. In some implementations, the memory 130 can include extendible storage units that can be added and used incrementally. In some implementations, the memory 130 can be a portable memory (for example, a flash drive, a portable hard disk, and/or the like) that can be operatively coupled to the processor 110. In some instances, the memory 130 can be remotely operatively coupled with a compute device (not shown). For example, a remote database device can serve as a memory and be operatively coupled to the processor 110. The processor 110 can access data stored on the memory 130; for example, the processor 110 can access at least the data collected by the stereo camera pair 120 and stored in the memory 130.

The memory 130 can store the instructions that can be executed by the processor 110, and/or data detected by the stereo camera pair 120. The memory 130 can store one or more software algorithm(s) (not shown). The software algorithm(s) can be, for example, an artificial intelligence (AI) model(s) or algorithm(s), a machine learning (ML) model(s) or algorithm(s), an analytical model(s) or algorithm(s), a rule-based model(s) or algorithm(s), or a mathematical model(s) or algorithm(s). After the processor 110 has received the image data collected by the stereo camera pair 120, the processor 110 can process the data using software algorithm(s) to estimate depth based on the image data from stereo camera pair 120.

The stereo camera pair 120 can include, for example, at least two stereo cameras such as first camera 121 and second camera 122 for collecting image data associated with the vehicle 100. The stereo camera pair 120 can be used to observe and gather information that can be useful for performing the techniques discussed herein, such as information associated with an external environment of the vehicle 100 and/or the vehicle 100 itself. The stereo camera pair 120 can generate image data that includes representations of attributes associated with an external environment of the vehicle 100, such as a speed, location, acceleration, size, type, relative distance, movement pattern, etc. of other vehicles, pedestrians, animals, obstacles, rain drops, snowflakes, haze particle, fog particle, etc., and/or the location, type, relative distance, size, shape, etc. of signs, lane markers, shoulder areas, roads, buildings, etc. In some implementations, image data collected by the stereo camera pair 120 includes information representing a topography surrounding the vehicle 100, such as a road, sign, traffic light, walkway, building, body of water, etc. The stereo camera pair 120 is disposed on or with the autonomous vehicle 100. The first camera 121 and second camera 122 can be arranged as parallel or non-parallel (in other words, at an angle to each other) for generating images from different viewpoints.

The driving controller 140 can be or include, for example, a hardware-based integrated circuit (IC) or any other suitable processing device configured to run and/or execute a set of instructions or code. For example, the driving controller 140 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the driving controller 140 can run any of the methods and/or portions of methods discussed herein.

The driving controller 140 is communicatively coupled to the processor 110 and a plurality of operational systems (not shown) of the vehicle 100 for example, through a communications network (not shown). The communications network can be any suitable communications network(s) for transferring data. In some instances, the communication network(s) can be a wired network such as, an Ethernet backbone network, a controller area network (CAN), a local interconnect network (LIN), a media-oriented system transport (MOST), a fiber-optic network, a digital subscription line ("DSL") network, a broadband network, and/or a flexray network. In other instances, the communication network(s) can a wireless network such as, for example, a Wi-Fi or wireless local area network ("WLAN"), a wireless wide area network ("WWAN"), and/or a cellular network. The communication network interconnects driving controller 140 with the processor 110 and other operational systems within the vehicle 100 and exchanges information between driving controller 140 and processor 110 and/or other operational systems for controlling one or more operations of the vehicle 100. The driving controller 140 can be part of the existing control system (not shown) of the vehicle 100 or can be a separate control unit that can be added to the vehicle 100.

The driving controller 140 is configured to control one or more operations (e.g., autonomous driving, semi-autonomous driving, etc.) of the vehicle 100. In some implementations, the driving controller 140 can work together with the processor 110 to control maneuvers of the vehicle 100. For example, the driving controller 140 receives signal from the processor 110 (e.g., depth information from the processor 110) and decides that the vehicle 100 needs to slow down or change a lane to keep a safe distance from the other vehicle in front. The driving controller 140 can control the speed, direction, or lane change maneuver etc. of the vehicle 100 to ensure safety of the vehicle while driving. In some implementations, the driving controller 140 can control the maneuvers of the vehicle 100 directly by controlling the speed, torque etc. of the vehicle 100. In some implementations, the driving controller 140 can send control signals to other controllers (e.g., electronic control units (ECU), not shown) to control the speed, torque, lane change maneuver etc. of the vehicle 100.

The vehicle 100 (e.g., an autonomous vehicle) can be, for example, a medium truck, heavy truck, very heavy truck, a vehicle that is greater than 14,000 pounds, a vehicle that is greater than 26,000 pounds, a vehicle that is greater than 70,000 pounds, or a vehicle that is greater than 80,000 pounds. To ensure that larger vehicles have sufficient time/distance to perform appropriate actions, tamper event may be detected sufficiently in advance.

Figure 2:
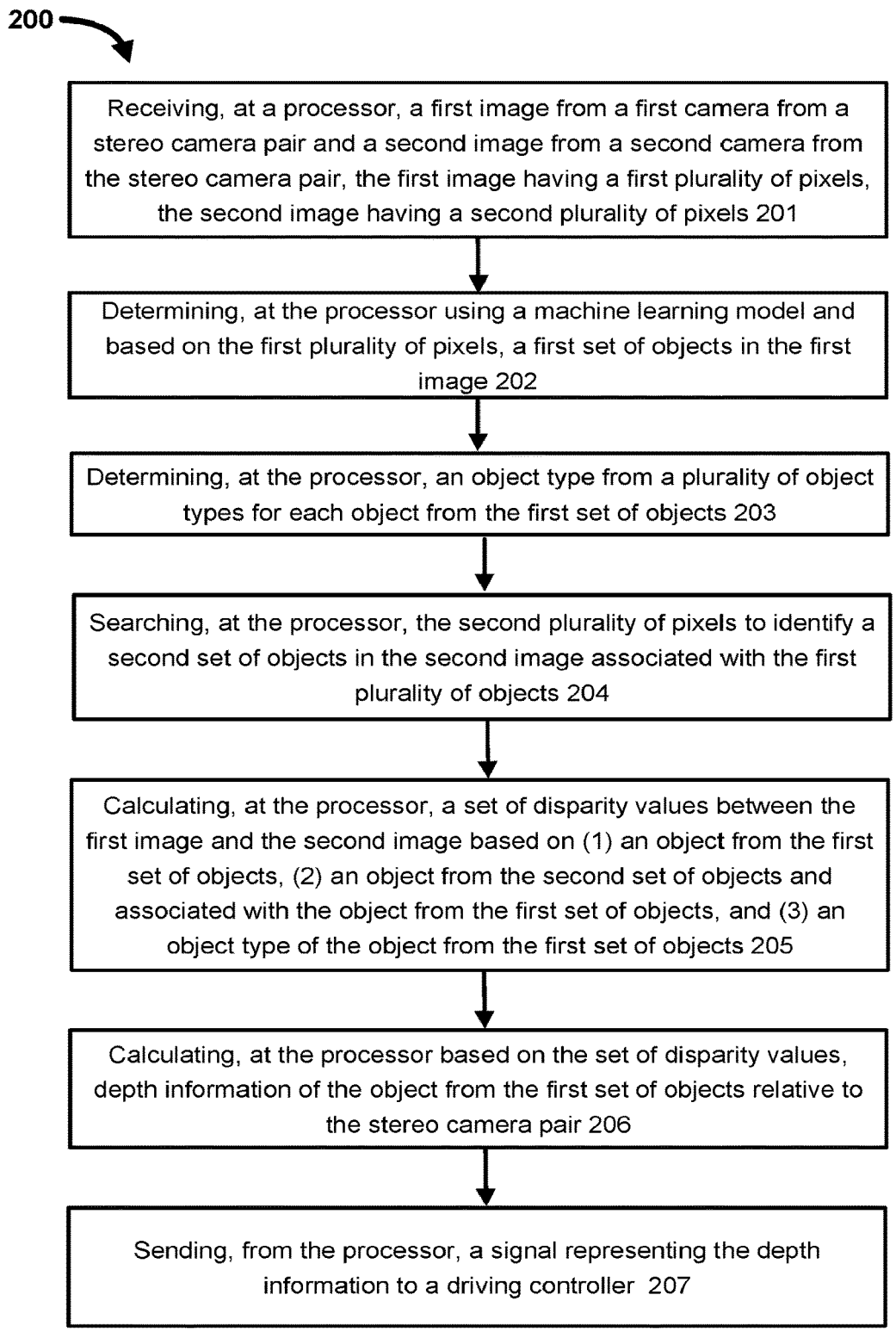
FIG. 2 is a flow diagram of a method for depth estimation using stereo cameras, according to an embodiment.

FIG. 2 is a flow diagram of a method for depth estimation using stereo cameras, according to an embodiment. The method 200 of FIG. 2 can be implemented, for example, using the processor 110 of the vehicle 100 in FIG. 1. The method 200 can be performed, for example, while the driving vehicle is in motion.

As shown in FIG. 2, at 201, the method begins with receiving, at a processor (e.g., processor 110 in FIG. 1), a first image from a first camera (e.g., first camera 121 in FIG. 1) from a stereo camera pair (e.g., stereo camera pair 120 in FIG. 1) and a second image from a second camera (e.g., second camera 122 in FIG. 1) from the stereo camera pair (e.g., stereo camera pair 120 in FIG. 1). The first image has a first plurality of pixels and the second image has a second plurality of pixels.

The first image can be detected by the first camera in the stereo camera pair (e.g., stereo camera pair 120 in FIG. 1). The second image can be detected by the second camera in the stereo camera pair (e.g., stereo camera pair 120 in FIG. 1). The first and second cameras can be arranged in parallel position on a vehicle (e.g., autonomous vehicle 100 in FIG. 1) or non-parallel position on the vehicle (such as arranging first and second cameras at an angle). The stereo camera pair is disposed on or with the driving vehicle (e.g., vehicle 100 in FIG. 1).

At 202, the method continues with determining, at the processor (e.g., processor 110 in FIG. 1) using a machine learning model and based on the first plurality of pixels, a first set of objects in the first image. The first set of objects can include, for example one or more of vehicles, pedestrians, animals, obstacles, rain drops, snowflakes, haze particle, fog particle, etc., and/or signs, lane markers, shoulder areas, roads, grounds, buildings, poles, dividers, sky, walls, distant backgrounds, etc.

At 203, the method continues with determining, at the processor (e.g., processor 110 in FIG. 1), an object type from a plurality of object types for each object from the first set of objects. The object type can be, for example, a vehicle type, a ground type, a wall type, a pole type, a pedestrian type, a divider type, a distant background type, a traffic sign type, a tree type, a building type, an animal type, a speed bump type, or a similar type descriptive of the type of object.

At 204, the method continues with searching, at the processor (e.g., processor 110 in FIG. 1), the second plurality of pixels to identify a second set of objects in the second image associated with the first plurality of objects. The object type includes at least one of a vehicle type, a ground type, a wall type, a pole type, a pedestrian type, a divider type, a distant background type, a traffic sign type, a tree type, a building type, an animal type, a speed bump type, or a similar type descriptive of the type of object.

At 205, the method continues with calculating, at the processor (e.g., processor 110 in FIG. 1), a set of disparity values between the first image and the second image based on (1) an object from the first set of objects, (2) an object from the second set of objects and associated with the object from the first set of objects, and (3) an object type of the object from the first set of objects. Calculating the set of disparity values is further discussed in connection with FIG. 5.

Figure 5:
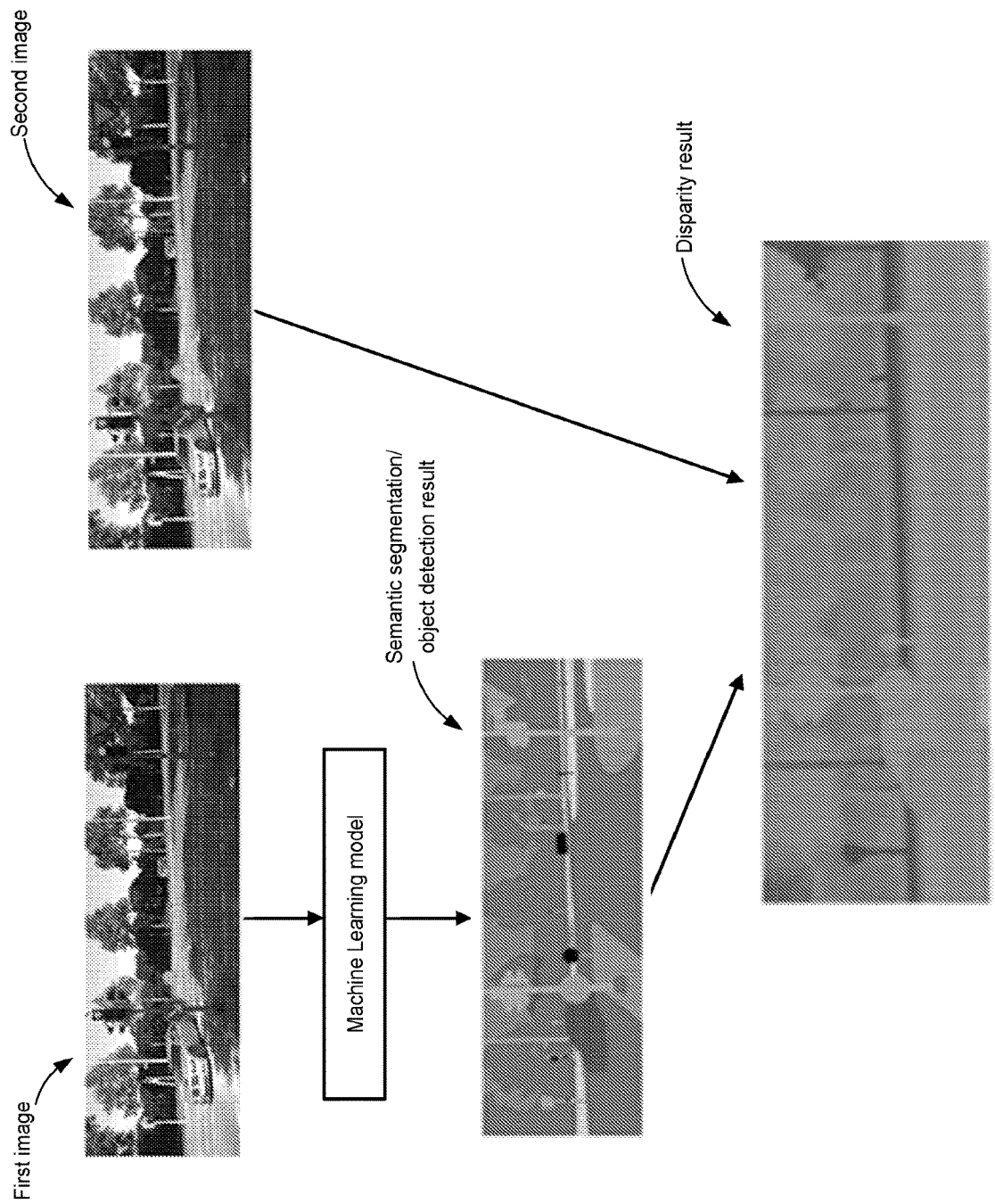
FIG. 5 is a diagram that includes example images used during the performance of a method for disparity calculation, according to an embodiment.

FIG. 5 is a diagram that includes example images used during the performance of a method for disparity calculation, according to an embodiment. Steps 201-205 in FIG. 2 are discussed in connection with FIG. 5. As shown in FIG. 5, a first image from a first camera (e.g., first camera 121 in FIG. 1) from a stereo camera pair (e.g., stereo camera pair 120 in FIG. 1) and a second image from a second camera (e.g., second camera 122 in FIG. 1) from the stereo camera pair (e.g., stereo camera pair 120 in FIG. 1) can be received at a processor (e.g., processor 110 in FIG. 1). The first image has a first plurality of pixels and the second image has a second plurality of pixels. A machine learning model is used by the processor to determine a first set of objects in the first image based on the first plurality of pixels from the first image. An object(s) from the first set of objects can include, for example vehicles, pedestrians, animals, obstacles, rain drops, snowflakes, haze particle, fog particle, etc., and/or can indicate location, type, relative distance, size, shape, etc. of signs, lane markers, shoulder areas, roads, grounds, buildings, poles, dividers, sky, walls, distant backgrounds, etc. An object type from a plurality of object types for each object from the first set of objects is determined by the processor (e.g., using semantic segmentation/object detection) and represented in FIG. 5 by the image labeled "Semantic segmentation/objection detection result". The object type can include, for example, at least one of a vehicle type, a ground type, a wall type, a pole type, a pedestrian type, a divider type, a distant background type, a traffic sign type, a tree type, a building type, an animal type, a speed bump type, etc. A second set of objects in the second image associated with the first plurality of objects is searched by the processor. A set of disparity values between the first image and the second image is calculated based on (1) an object from the first set of objects, (2) an object from the second set of objects and associated with the object from the first set of objects, and (3) an object type of the object from the first set of objects. The set of disparity values is represented in FIG. 5 by the image labeled "Disparity result".

Figure 6:
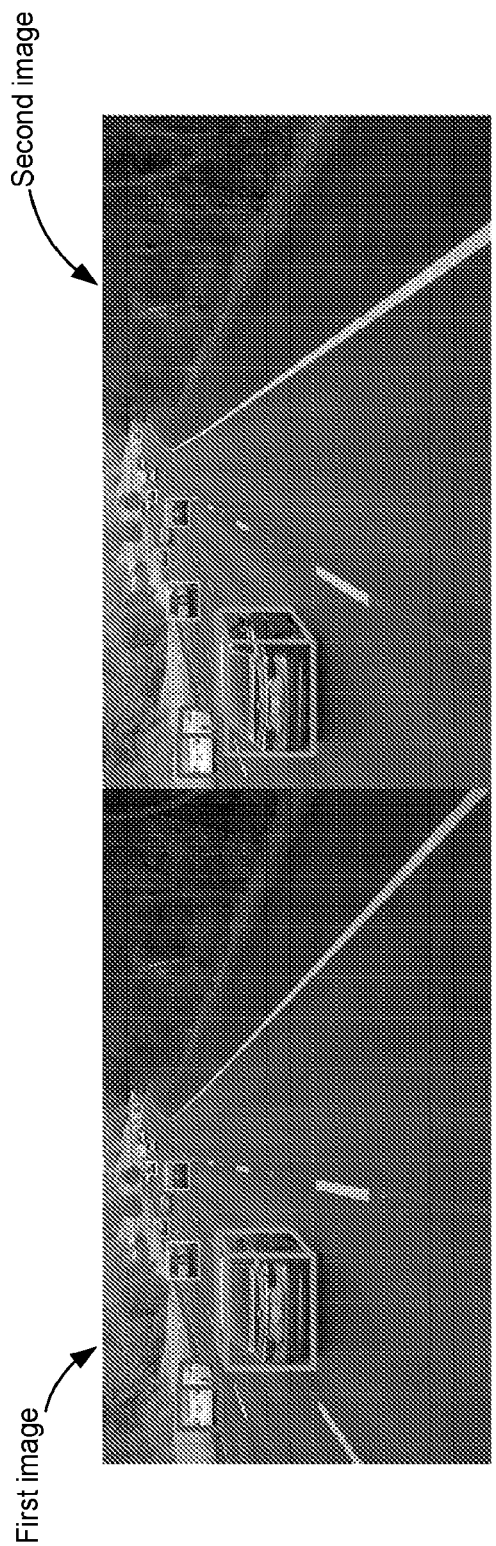
FIG. 6 is a diagram showing an example of images of a region of interest, according to an embodiment.

In some implementations, when the object type of the object from the first set of objects is a vehicle type, the method further comprises generating a first bounding box in a cuboid shape to represent a first region of interest corresponding to the object from the first set of objects. Searching the second plurality of pixels includes searching for a second bounding box in the second image that substantially matches the first bounding box and represents a second region of interest corresponding to the object from the second set of objects. FIG. 6 is a diagram showing an example of images of a region of interest, according to an embodiment. As shown in FIG. 6, the object type is a vehicle type, and a first bounding box in a cuboid shape to represent a first region of interest corresponding to the object from the first set of objects is generated. In some implementations, a plurality of first cuboid shape bounding boxes can be generated to represent a plurality of regions of interest corresponding to the first set of objects (e.g., vehicles). Searching on the second image includes searching for a second bounding box in the second image that substantially matches the first bounding box and represents a second region of interest corresponding to the object from the second set of objects. In some implementations, a plurality of second cuboid shape bounding boxes can be searched to find substantial matching with the plurality of first cuboid shape bounding boxes, and representing a plurality of second regions of interest corresponding to the second set of objects (e.g., vehicles).

Figure 7:
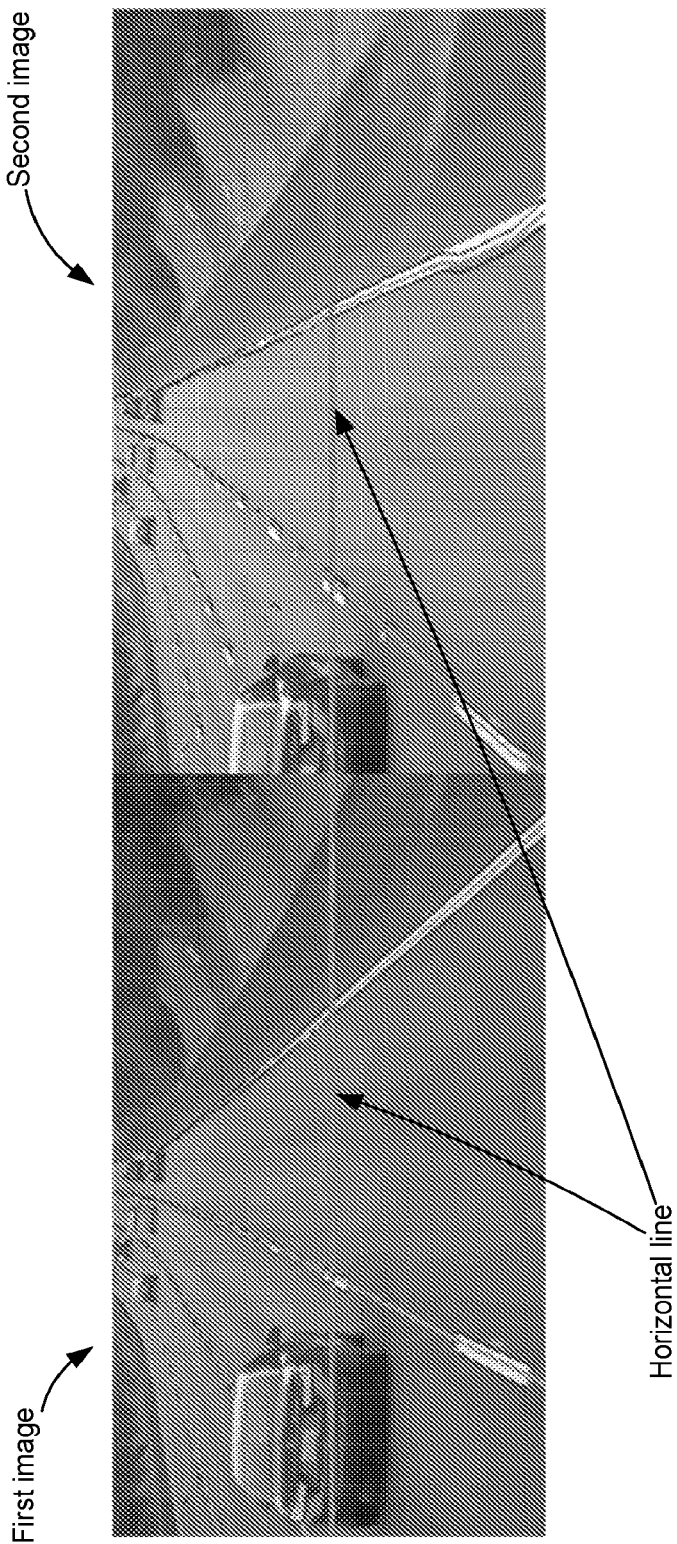
FIG. 7 is a diagram showing an example of images of a region of interest, according to another embodiment.

In some implementations, when the object type of the object from the first set of objects is a ground type (e.g., highway), a same horizontal line can be defined to represent region of interest on both the first image and the second image. The horizontal line on the first image and the second image has the same disparity, and the disparity continuously becomes smaller from the bottom of the image to the top of the image (due to principle of perspectives). FIG. 7 is a diagram showing an example of images of a region of interest, according to another embodiment. As shown in FIG. 7, the object type is a ground type (e.g., highway). A same horizontal line can be defined to represent region of interest on both the first image and the second image. The horizontal line on the first image and the second image has the same disparity, and the disparity continuously becomes smaller from the bottom of the image to the top of the image (due to principle of perspectives).

In some implementations, the calculating the set of disparity values includes (1) sampling a first set of pixels in the first region of interest and a second set of pixels in the second region of interest and (2) calculating the set of disparity values based on the first set of pixels and the second set of pixels. For example, when the object type is a vehicle type, a pole type, a pedestrian type, a traffic sign type, a building type, an animal type, a speed bump type etc., disparity is the same for the whole object on both the first image and the second image. The calculating the set of disparity values includes (1) sampling a first set of pixels in the first region of interest and a second set of pixels in the second region of interest and (2) calculating the set of disparity values based on the first set of pixels and the second set of pixels. Thus, the calculation for disparity for all pixels can be reduced significantly due to only calculation for disparity based on only sampled pixels and the result can be more accurate with reduced computational expenses. Stated differently, the method includes not calculating the set of disparity values between each pixel from the first region of interest and each pixel from the second region of interest. In some implementations, when the object type is a distant background type (e.g., sky, ocean, etc.), disparity is not calculated or calculated with less computational power because the depth of distant background is not as important as other object types such as a vehicle type, a ground type, a wall type, a pole type, a pedestrian type, a divider type, a traffic sign type, a tree type, a building type, an animal type, a speed bump type, etc.

At 206, the method continues with calculating, at the processor (e.g., processor 110 in FIG. 1) and based on the set of disparity values, depth information of the object from the first set of objects relative to the stereo camera pair. With the disparity values, depth information (e.g., a depth map as shown in FIG. 5) can be calculated. Additional information related to depth calculation is provided, for example, in each of U.S. Patent Application Publication No. 2021/0174530 and U.S. Pat. No. 10,957,064 all of which are incorporated herein by reference in their entireties.

At 207, the method continues with sending, from the processor (e.g., processor 110 in FIG. 1), a signal representing the depth information to a driving controller (e.g., driving controller 140).

Figure 3:
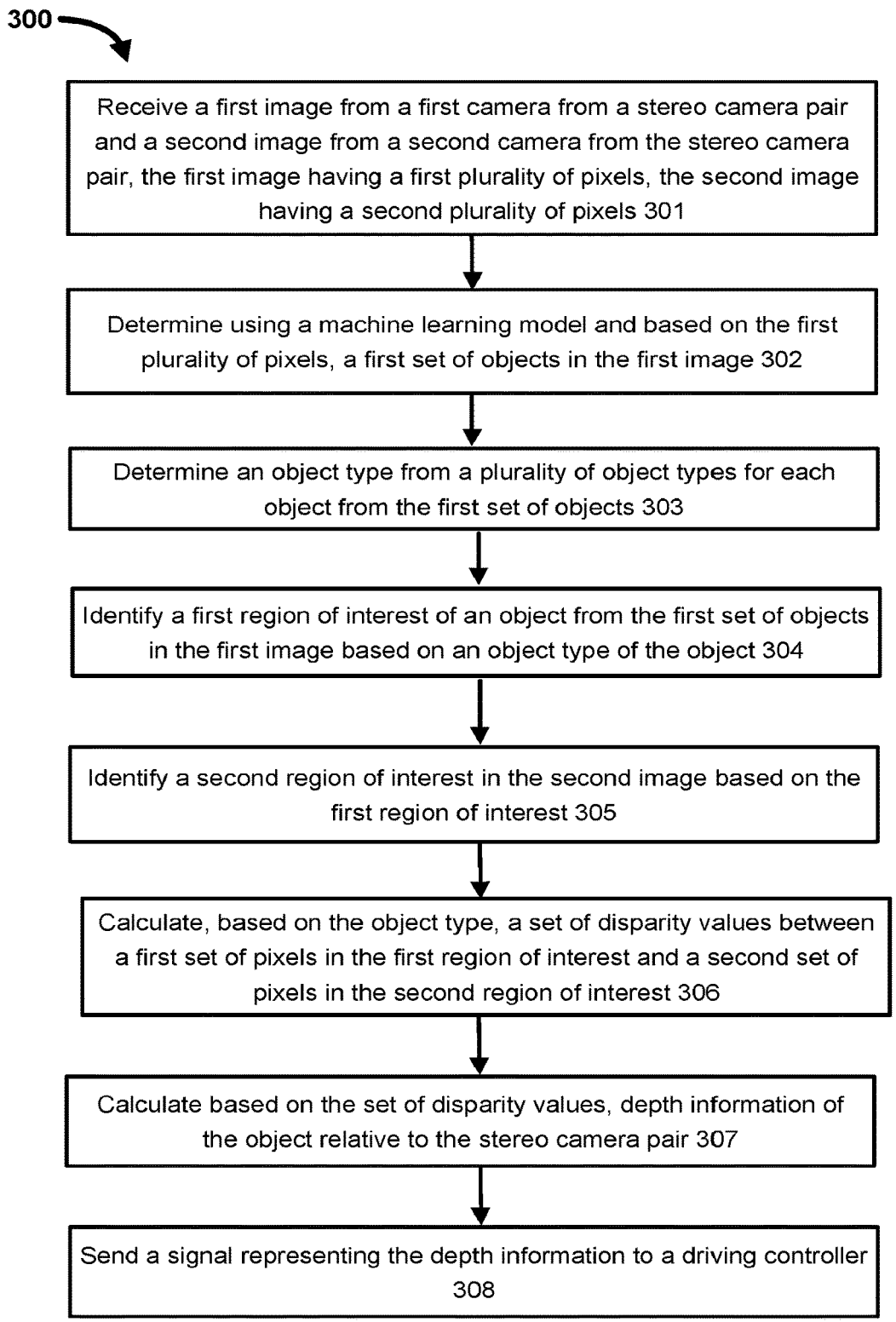
FIG. 3 is a flow diagram of a method for depth estimation using stereo cameras, according to another embodiment.

FIG. 3 is a flow diagram of a method for depth estimation using stereo cameras, according to another embodiment. The method 300 of FIG. 3 can be implemented, for example, using the processor 110 the vehicle 100 in FIG. 1.

As shown in FIG. 3, at 301, the method begins with receiving a first image from a first camera (e.g., first camera 121 in FIG. 1) from a stereo camera pair (e.g., stereo camera pair 120 in FIG. 1) and a second image from a second camera (e.g., second camera 122 in FIG. 1) from the stereo camera pair (e.g., stereo camera pair 120 in FIG. 1). The first image has a first plurality of pixels and the second image has a second plurality of pixels. The first image can be detected by the first camera in the stereo camera pair (e.g., stereo camera pair 120 in FIG. 1). The second image can be detected by the second camera in the stereo camera pair (e.g., stereo camera pair 120 in FIG. 1). The first and second cameras can be arranged in parallel position on a vehicle (e.g., vehicle 100 in FIG. 1) or non-parallel position on the vehicle (such as arranging first and second cameras at an angle). The stereo camera pair is disposed on (e.g., fixedly mounted on) or with the vehicle (e.g., vehicle 100 in FIG. 1). The method 300 is performed while the vehicle is in motion.

At 302, the method continues with determining, using a machine learning model and based on the first plurality of pixels, a first set of objects in the first image. An object from the first set of objects can include, for example, vehicles, pedestrians, animals, obstacles, rain drops, snowflakes, haze particle, fog particle, etc., and/or can indicate the location, type, relative distance, size, shape, etc. of signs, lane markers, shoulder areas, roads, grounds, buildings, poles, dividers, sky, walls, distant backgrounds etc.

At 303, the method continues with determining an object type from a plurality of object types for each object from the first set of objects. The object type includes, for example, at least one of a vehicle type, a ground type, a wall type, a pole type, a pedestrian type, a divider type, a distant background type, a traffic sign type, a tree type, a building type, an animal type, a speed bump type, etc.

At 304, the method continues with identifying a first region of interest of an object from the first set of objects in the first image based on an object type of the object. At 305, the method continues with identifying a second region of interest in the second image based on the first region of interest. Examples of regions of interest are shown in FIGS. 6 and 7, as discussed above.

At 306, the method continues with calculating, based on the object type, a set of disparity values between a first set of pixels in the first region of interest and a second set of pixels in the second region of interest. In some implementations, the calculating includes sampling the first set of pixels in the first region of interest and the second set of pixels in the second region of interest. For example, when the object type is a vehicle type, a pole type, a pedestrian type, a traffic sign type, a building type, an animal type, a speed bump type etc., disparity is the same for the whole object on both the first image and the second image. The calculating the set of disparity values includes sampling the first set of pixels in the first region of interest and the second set of pixels in the second region of interest. Thus, the calculation for disparity for all pixels can be reduced significantly due to only calculation for disparity based on only sampled pixels and the result can be more accurate with reduced computational expenses. Stated differently, the method includes not calculating the set of disparity values between each pixel from the first region of interest and each pixel from the second region of interest. In some implementations, when the object type is a vehicle type, the set of disparity values between the first region of interest and the second region of interest is associated with the cuboid shape. In some implementations, when the object type is a distant background type (e.g., sky, ocean, etc.), disparity is not calculated or calculated with less computational power because the depth of distant background is not as important as other object types such as a vehicle type, a ground type, a wall type, a pole type, a pedestrian type, a divider type, a traffic sign type, a tree type, a building type, an animal type, a speed bump type, etc.

In some implementations, when the object type of the object is a ground type (e.g., highway), a first horizontal line to represent the first region of interest is generated on the first image. The method also includes searching the second plurality of pixels for a second horizontal line in the second image that substantially matches the first horizontal line and represents the second region of interest on the second image. The method further includes sampling the first set of pixels in the first region of interest and the second set of pixels in the second region of interest to calculate the set of disparity values. As discussed above, FIG. 7 is a diagram showing examples of images of a region of interest, according to another embodiment, where the object type is a ground type (e.g., highway). A first horizontal line to represent the first region of interest is generated on the first image. A second horizontal line in the second image that substantially matches the first horizontal line and represents the second region of interest on the second image is generated by searching the second plurality of pixels. The set of disparity values between the first region of interest and the second region of interest are equal along the first horizontal line. The set of disparity values continuously become smaller when the first horizontal line changes from the bottom of the first image to a top of the first image (due to principle of perspectives). Sampling can be done to reduce the computational expenses when disparity values are smaller (e.g., at the top of the image) and generate faster and accurate disparity result. In some implementations, the object type can include, for example, at least one of a vehicle type, a ground type, a wall type, a pole type, a pedestrian type, a divider type, a distant background type, a traffic sign type, a tree type, a building type, an animal type, a speed bump type, or any combination thereof.

At 307, the method continues with calculating based on the set of disparity values, depth information of the object relative to the stereo camera pair (e.g., stereo camera pair 120 in FIG. 1). With the disparity values, depth information (e.g., a depth map as shown in FIG. 5) can be calculated. Additional information related to depth calculation is provided, for example, in each of U.S. Patent Application Publication No. 2021/0174530 and U.S. Pat. No. 10,957,064 all of which are incorporated herein by reference in their entireties.

At 308, the method continues with sending a signal representing the depth information to a driving controller (e.g., driving controller 140 in FIG. 1).

Figure 4:
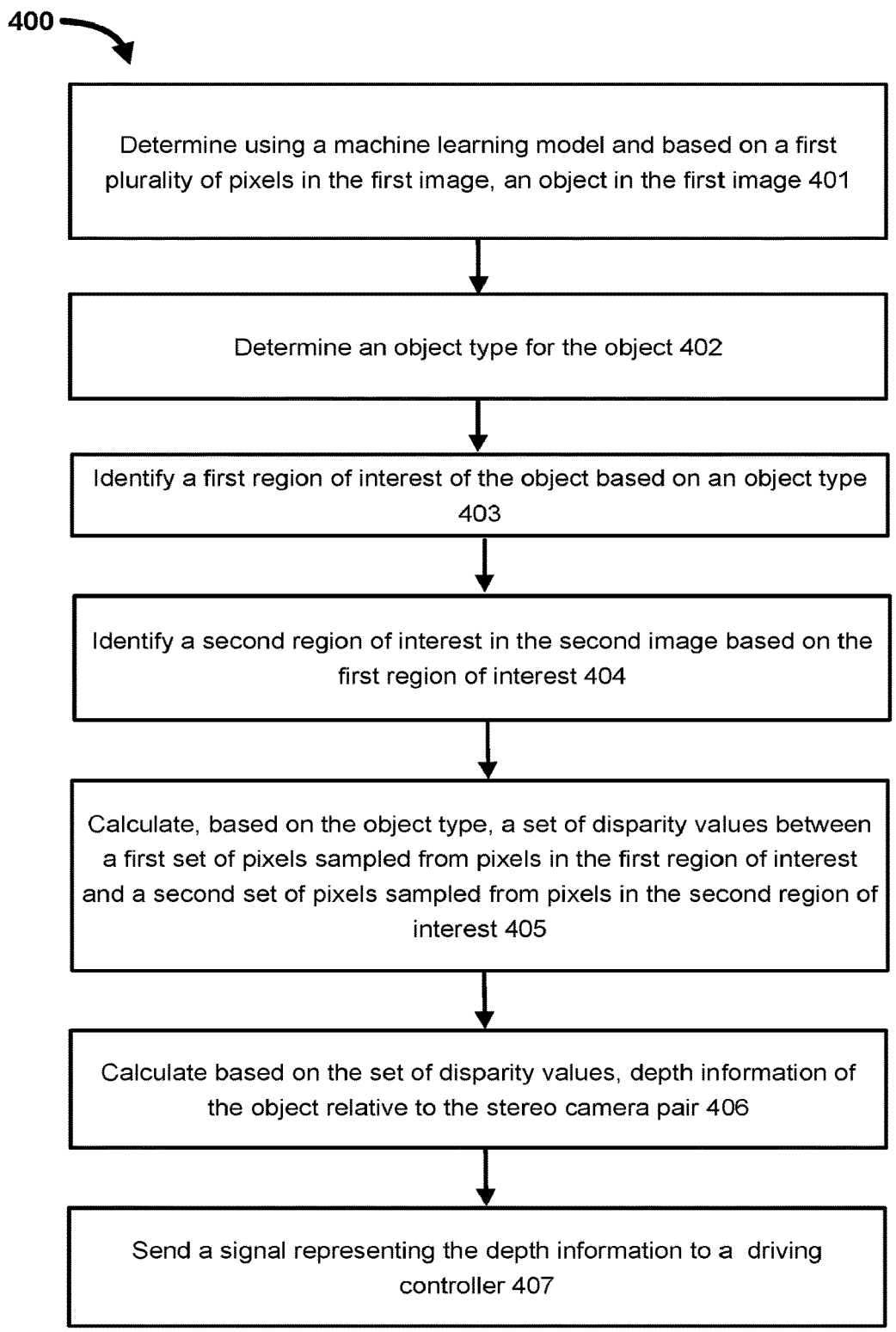
FIG. 4 is a flow diagram of a method for depth estimation using stereo cameras, according to yet another embodiment.

FIG. 4 is a flow diagram of a method for depth estimation using stereo cameras, according to yet another embodiment. The method 400 of FIG. 4 can be implemented, for example, using the processor 110 of the vehicle 100 in FIG. 1.

As shown in FIG. 4, at 401, the method begins with determining using a machine learning model and based on a first plurality of pixels in the first image, an object in the first image. The first image can be detected by the first camera in the stereo camera pair (e.g., stereo camera pair 120 in FIG. 1). The second image can be detected by the second camera in the stereo camera pair (e.g., stereo camera pair 120 in FIG. 1). The first and second cameras can be arranged in parallel position on a vehicle (e.g., vehicle 100 in FIG. 1) or non-parallel position on the vehicle (such as arranging first and second cameras at an angle). The stereo camera pair is disposed on or with the vehicle (e.g., vehicle 100 in FIG. 1). The method 400 is performed while the vehicle is in motion. The object can include, for example vehicles, pedestrians, animals, obstacles, rain drops, snowflakes, haze particle, fog particle, etc., and/or location, type, relative distance, size, shape, etc. of signs, lane markers, shoulder areas, roads, grounds, buildings, poles, dividers, sky, walls, distant backgrounds etc.

At 402, the method continues with determining an object type for the object. The object type can include, for example, at least one of a vehicle type, a ground type, a wall type, a pole type, a pedestrian type, a divider type, a distant background type, a traffic sign type, a tree type, a building type, an animal type, a speed bump type, etc.

At 403, the method continues with identifying a first region of interest of the object based on an object type. At 404, the method continues with identifying a second region of interest in the second image based on the first region of interest. Examples of region of interest are shown in FIGS. 6 and 7, as discussed above.

At 405, the method continues with calculating, based on the object type, a set of disparity values between a first set of pixels sampled from pixels in the first region of interest and a second set of pixels sampled from pixels in the second region of interest. For example, when the object type is a vehicle type, a pole type, a pedestrian type, a traffic sign type, a building type, an animal type, a speed bump type etc., disparity is the same for the whole object on both the first image and the second image. The calculating the set of disparity values includes sampling the first set of pixels in the first region of interest and the second set of pixels in the second region of interest. Thus, the calculation for disparity for all pixels can be reduced significantly due to only calculating for disparity based on only sampled pixels and the result can be more accurate with reduced computational expenses. In some implementations, when the object type is a vehicle type, the set of disparity values between the first region of interest and the second region of interest is associated with the cuboid shape and the disparity value is the same for the whole region of interest. Stated differently, the method includes not calculating the set of disparity values between each pixel from the first region of interest and each pixel from the second region of interest. In some implementations, when the object type is a distant background type (e.g., sky, ocean, etc.), disparity is not calculated or calculated with less computational power because the depth of distant background is not as important as other object types such as a vehicle type, a ground type, a wall type, a pole type, a pedestrian type, a divider type, a traffic sign type, a tree type, a building type, an animal type, a speed bump type, etc.

In some implementations, when the object type of the object is a ground type (e.g., highway), a first horizontal line to represent the first region of interest is generated on the first image. The method also includes searching the second plurality of pixels to generate a second horizontal line in the second image that substantially matches the first horizontal line and represents the second region of interest on the second image. As discussed above, FIG. 7 is a diagram showing examples of images of a region of interest, according to another embodiment, where the object type is a ground type (e.g., highway). A first horizontal line to represent the first region of interest is generated on the first image. A second horizontal line in the second image that substantially matches the first horizontal line and represents the second region of interest on the second image is generated by searching the second plurality of pixels. The set of disparity values between the first region of interest and the second region of interest are equal along the first horizontal line. The set of disparity values continuously become smaller when the first horizontal line changes from the bottom of the first image to a top of the first image (due to principle of perspectives). Stated differently, the set of disparity values when the first horizontal line is closer to a bottom of the first image is greater than the set of disparity values when the first horizontal line is closer to a top of the first image (due to principle of perspectives). In some implementations, sampling can be done to reduce the computational expenses when disparity values are smaller (e.g., at the top of the image) and generate faster and accurate disparity result. In some implementations, the object can be at least one of a vehicle type, a ground type, a wall type, a pole type, a pedestrian type, a divider type, a distant background type, a traffic sign type, a tree type, a building type, an animal type, a speed bump type, or any combination thereof.

In some implementations, when the object type of the object is a wall type, a first vertical line to represent the first region of interest corresponding to the object is generated. The second region of interest is identified by searching for a second vertical line in the second image that substantially matches the first vertical line and represents the second region of interest corresponding to the object. The set of disparity values between the first region of interest and the second region of interest are equal along the first vertical line. The set of disparity values continuously become smaller when the first vertical line changes from the left or right of the first image to center of the first image (due to principle of perspectives). In some implementations, sampling can be done to reduce the computational expenses when disparity values are smaller (e.g., at the center of the image) and generate faster and accurate disparity result. In some implementations, the object can be at least one of a vehicle type, a ground type, a wall type, a pole type, a pedestrian type, a divider type, a distant background type, a traffic sign type, a tree type, a building type, an animal type, a speed bump type, or any combination thereof.

At 406, the method continues with calculating based on the set of disparity values, depth information of the object relative to the stereo camera pair (e.g., stereo camera pair 120 in FIG. 1). With the disparity values, depth information (e.g., a depth map as shown in FIG. 5) can be calculated. Additional information related to depth calculation is provided in each of U.S. Patent Application Publication No. 2021/0174530 and U.S. Pat. No. 10,957,064 all of which are incorporated herein by reference in their entireties.

At 407, the method continues with sending a signal representing the depth information to a driving controller (e.g, driving controller 140 in FIG. 1) for autonomous driving. The depth information includes a depth map indicating a distance between a corresponding point on the object and the stereo camera pair.

In some embodiments, a method comprises: receiving, at a processor, a first image from a first camera from a stereo camera pair and a second image from a second camera from the stereo camera pair. The first image has a first plurality of pixels. The second image has a second plurality of pixels. The method also includes determining, at the processor using a machine learning model and based on the first plurality of pixels, a first set of objects in the first image. The processor determines an object type from a plurality of object types for each object from the first set of objects. The processor searches the second plurality of pixels to identify a second set of objects in the second image associated with the first plurality of objects. The method also includes calculating, at the processor, a set of disparity values between the first image and the second image based on (1) an object from the first set of objects, (2) an object from the second set of objects and associated with the object from the first set of objects, and (3) an object type of the object from the first set of objects. The processor calculates, based on the set of disparity values, depth information of the object from the first set of objects relative to the stereo camera pair. The processor sends a signal representing the depth information to a driving controller.

In some embodiments, the plurality of object types includes at least one of a vehicle type, a ground type, a wall type, a pole type, a pedestrian type, a divider type, or a distant background type.

In some embodiments, when the object type of the object from the first set of objects is a vehicle type, the method further comprises generating a first bounding box in a cuboid shape to represent a first region of interest corresponding to the object from the first set of objects. The searching the second plurality of pixels includes searching for a second bounding box in the second image that substantially matches the first bounding box and represents a second region of interest corresponding to the object from the second set of objects. The calculating the set of disparity values includes (1) sampling a first set of pixels in the first region of interest and a second set of pixels in the second region of interest and (2) calculating the set of disparity values based on the first set of pixels and the second set of pixels.

In some embodiments, the method comprises not calculating the set of disparity values between each pixel from the first region of interest and each pixel from the second region of interest.

In some embodiments, the set of disparity values between the first region of interest and the second region of interest is associated with the cuboid shape.

In some embodiments, the stereo camera pair is disposed on or with a semi-autonomous driving vehicle. The method is performed while the semi-autonomous driving vehicle is in motion.

In some embodiments, a non-transitory processor-readable medium storing code representing instructions to be executed by a processor, the code comprising code to cause the processor to receive a first image from a first camera from a stereo camera pair and a second image from a second camera from the stereo camera pair. The first image has a first plurality of pixels. The second image has a second plurality of pixels. A first set of objects in the first image is determined using a machine learning model and based on the first plurality of pixels. An object type from a plurality of object types is determined for each object from the first set of objects. A first region of interest of an object from the first set of objects in the first image is identified based on an object type of the object. A second region of interest in the second image based on the first region of interest is identified. A set of disparity values between a first set of pixels in the first region of interest and a second set of pixels in the second region of interest is calculated based on the object type. Depth information of the object relative to the stereo camera pair is calculated based on the set of disparity values. A signal representing the depth information is sent to a driving controller.

In some embodiments, when the object type of the object is a vehicle type, the code to cause the processor to define the first region of interest includes code to cause the processor to generate a first bounding box in a cuboid shape to represent the first region of interest. The code to cause the processor to identify the second region of interest includes code to cause the processor to search the second plurality of pixels for a second bounding box in the second image that substantially matches the first bounding box and represents the second region of interest. The code to cause the processor to calculate the set of disparity values includes code to cause the processor to sample the first set of pixels in the first region of interest and the second set of pixels in the second region of interest.

In some embodiments, the code further includes code to cause the processor to not calculate the set of disparity values between each pixel from the first region of interest and each pixel from the second region of interest.

In some embodiments, the set of disparity values between the first region of interest and the second region of interest is associated with the cuboid shape.

In some embodiments, when the object type of the object is a ground type, the code to cause the processor to define the first region of interest includes code to cause the processor to generate a first horizontal line to represent the first region of interest. The code to cause the processor to identify the second region of interest includes code to cause the processor to search the second plurality of pixels for a second horizontal line in the second image that substantially matches the first horizontal line and represents the second region of interest. The code to cause the processor to calculate the set of disparity values includes code to cause the processor to sample the first set of pixels in the first region of interest and the second set of pixels in the second region of interest.

In some embodiments, the set of disparity values between the first region of interest and the second region of interest equal along the first horizontal line.

In some embodiments, the set of disparity values continuously become smaller when the first horizontal line changes from the bottom of the first image to a bottom of the first image to a top of the first image.

In some embodiments, a system includes a stereo camera pair having a first camera configured to capture a first image and a second camera configured to capture a second image. The system also includes a processor operatively coupled to the stereo camera pair and a memory operatively coupled to the processor. The memory stores instructions that when executed to cause the processor to determine using a machine learning model and based on a first plurality of pixels in the first image, an object in the first image. The processor is also configured to determine an object type for the object. The processor is configured to identify a first region of interest of the object based on an object type. The processor is also configured to identify a second region of interest in the second image based on the first region of interest. The processor is configured to calculate, based on the object type, a set of disparity values between a first set of pixels sampled from pixels in the first region of interest and a second set of pixels sampled from pixels in the second region of interest. The processor is configured to calculate based on the set of disparity values, depth information of the object relative to the stereo camera pair. The processor is also configured to send a signal representing the depth information to a driving controller.

In some embodiments, when the object type is a ground type, the memory further comprises instructions that when executed causes the processor to generate a first horizontal line to represent the first region of interest. The instructions that when executed cause the processor to identify the second region of interest includes instructions that cause the processor to search for a second horizontal line in the second image that substantially matches the first horizontal line and represents the second region of interest corresponding to the object.

In some embodiments, the set of disparity values between the first region of interest and the second region of interest equal along the first horizontal line.

In some embodiments, the set of disparity values when the first horizontal line is closer to a bottom of the first image is greater than the set of disparity values when the first horizontal line is closer to a top of the first image.

In some embodiments, the set of disparity values continuously become smaller when the first horizontal line changes from the bottom of the first image to a bottom of the first image to a top of the first image.

In some embodiments, when the object type of the object is a wall type, the memory further comprises instructions that when executed causes the processor to generate a first vertical line to represent the first region of interest corresponding to the object. The instructions that when executed cause the processor to identify the second region of interest includes instructions that cause the processor to search for a second vertical line in the second image that substantially matches the first vertical line and represents the second region of interest corresponding to the object.

In some embodiments, the depth information includes a depth map indicating a distance between a corresponding point on the object and the stereo camera pair.

All combinations of the foregoing concepts and additional concepts discussed here within (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The drawings are primarily for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational algorithm, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

As used herein, "substantially concurrently" can refer to events that take place at the same time when adjusted for processing-related delays (e.g., computation delay, transmission delay, etc.), or can refer to events that overlap in time.

As used herein, "substantially in real-time" can refer to an event that occurs immediately following a predicate event, adjusted for processing-related delays (e.g., computation delay, transmission delay, etc.).

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A computer-implemented method comprising:
generating, by a computing system, a first bounding box to represent a first region of interest in a first image;
searching, by the computing system, for a plurality of second bounding boxes in a second image that represent second regions of interest in the second image that correspond to the first region of interest in the first image;
determining, by the computing system, a second bounding box of the plurality of second bounding boxes in the second image that matches the first bounding box in the first image; and providing, by the computing system, depth information for an object in the first region of interest based on disparity values associated with the second bounding box that matches the first bounding box, the disparity values between a plurality of second sets of pixels sampled from the second regions of interest in the second image and a first set of pixels sampled from the first region of interest in the first image.

2. The computer-implemented method of claim 1, further comprising:
determining, by the computing system, the first region of interest based on semantic segmentation of the first image; and
determining, by the computing system, the second regions of interest based on semantic segmentation of the second image.

3. The computer-implemented method of claim 1, further comprising:
determining, by the computing system, semantic information associated with the first region of interest; and
selecting, by the computing system, the first set of pixels sampled from the first region of interest and the second sets of pixels sampled from the second regions of interest based on the semantic information.

4. The computer-implemented method of claim 1, wherein, the first bounding box includes at least one of: a portion of a road, a portion of a shoulder area, a portion of a ground, a portion of a wall, a portion of a sky, and a portion of a background, and wherein the plurality of second bounding boxes include at least one of: portions of the road, portions of the shoulder area, portions of the ground, portions of the wall, portions of the sky, and portions of the background.

5. The computer-implemented method of claim 1, further comprising:
identifying, by the computing system, a set of objects in the first image;
selecting, by the computing system, an object of the set of objects; and
determining, by the computing system, a size, a shape, and a location of the first region of interest in the image based on the object of the set of objects.

6. The computer-implemented method of claim 1, wherein the plurality of second bounding boxes include a plurality of objects in the second image, and wherein the determining the second bounding box of the plurality of bounding boxes is based on a match of an object of the plurality of objects in the second image with an object included in the first bounding box.

7. The computer-implemented method of claim 1, further comprising:
determining, by the computing system, an object type of an object in the first image; and
determining, by the computing system, a computational power at which to calculate the disparity values based on the object type.

8. The computer-implemented method of claim 1, further comprising:
providing, by the computing system, a signal that represents the depth information to a driving controller.

9. The computer-implemented method of claim 1, wherein the first bounding box and the plurality of second bounding boxes are cuboid shapes, horizontal lines, or vertical lines.

10. The computer-implemented method of claim 1, wherein the first image is from a first camera of a stereo camera pair, the second image is from a second camera of the stereo camera pair, and the depth information is relative to the stereo camera pair.

11. A system comprising:
at least one processor; and
a memory storing instructions that, when executed by the at least one processor, cause the system to perform operations comprising:
generating a first bounding box to represent a first region of interest in a first image;
searching for a plurality of second bounding boxes in a second image that represent second regions of interest in the second image that correspond to the first region of interest in the first image;
determining a second bounding box of the plurality of second bounding boxes in the second image that matches the first bounding box in the first image; and
providing depth information for an object in the first region of interest based on disparity values associated with the second bounding box that matches the first bounding box, the disparity values between a plurality of second sets of pixels sampled from the second regions of interest in the second image and a first set of pixels sampled from the first region of interest in the first image.

12. The system of claim 11, the operations further comprising:
determining the first region of interest based on semantic segmentation of the first image; and
determining the second regions of interest based on semantic segmentation of the second image.

13. The system of claim 11, the operations further comprising:
determining semantic information associated with the first region of interest; and
selecting the first set of pixels sampled from the first region of interest and the second sets of pixels sampled from the second regions of interest based on the semantic information.

14. The system of claim 11, wherein, the first bounding box includes at least one of: a portion of a road, a portion of a shoulder area, a portion of a ground, a portion of a wall, a portion of a sky, and a portion of a background, and wherein the plurality of second bounding boxes includes at least one of: portions of the road, portions of the shoulder area, portions of the ground, portions of the wall, portions of the sky, and portions of the background.

15. The system of claim 11, the operations further comprising:
identifying a set of objects in the first image;
selecting an object of the set of objects; and
determining a size, a shape, and a location of the first region of interest in the image based on the object of the set of objects.

16. A non-transitory computer-readable storage medium including instructions that, when executed by at least on processor of a computing system, cause the computing system to perform operations comprising:
generating a first bounding box to represent a first region of interest in a first image;
searching for a plurality of second bounding boxes in a second image that represent second regions of interest in the second image that correspond to the first region of interest in the first image;
determining a second bounding box of the plurality of second bounding boxes in the second image that matches the first bounding box in the first image; and providing depth information for an object in the first region of interest based on disparity values associated with the second bounding box that matches the first bounding box, the disparity values between a plurality of second sets of pixels sampled from the second regions of interest in the second image and a first set of pixels sampled from the first region of interest in the first image.

17. The non-transitory computer-readable storage medium of claim 16, the operations further comprising:
   determining the first region of interest based on semantic segmentation of the first image; and
   determining the second regions of interest based on semantic segmentation of the second image.

18. The non-transitory computer-readable storage medium of claim 16, the operations further comprising:
   determining semantic information associated with the first region of interest; and
   selecting the first set of pixels sampled from the first region of interest and the second sets of pixels sampled from the second regions of interest based on the semantic information.

19. The non-transitory computer-readable storage medium of claim 16, wherein, the first bounding box includes at least one of: a portion of a road, a portion of a shoulder area, a portion of a ground, a portion of a wall, a portion of a sky, and a portion of a background, and wherein the plurality of second bounding boxes includes at least one of: portions of the road, portions of the shoulder area, portions of the ground, portions of the wall, portions of the sky, and portions of the background.

20. The non-transitory computer-readable storage medium of claim 16, the operations further comprising:
   identifying a set of objects in the first image;
   selecting an object of the set of objects; and
   determining a size, a shape, and a location of the first region of interest in the image based on the object of the set of objects.

* * * * *